US008210295B2

(12) United States Patent
Kuramoto

(10) Patent No.: US 8,210,295 B2
(45) Date of Patent: Jul. 3, 2012

(54) ELECTRIC WHEELCHAIR

(76) Inventor: Yoshisuke Kuramoto, Tokyo (JP)

( * ) Notice: Subject to any disclaimer, the term of this patent is extended or adjusted under 35 U.S.C. 154(b) by 371 days.

(21) Appl. No.: 12/610,295

(22) Filed: Oct. 31, 2009

(65) Prior Publication Data

US 2010/0108418 A1 May 6, 2010

Related U.S. Application Data

(63) Continuation-in-part of application No. 11/515,664, filed on Sep. 6, 2006, now abandoned.

(30) Foreign Application Priority Data

May 30, 2005 (JP) ................................ 2005-184011

(51) Int. Cl.
*B60K 1/00* (2006.01)

(52) U.S. Cl. .................... 180/65.51; 180/65.1; 180/907; 280/250.1; 280/304.1

(58) Field of Classification Search ................. 180/65.1, 180/65.51, 907; 280/250.1, 304.1, 290, 778; 297/311, 330, 337; 341/20, 34
See application file for complete search history.

(56) References Cited

U.S. PATENT DOCUMENTS 2,572,149 A * 10/1951 Hind et al. .................... 280/290
4,249,774 A * 2/1981 Andreasson .................. 297/311
4,556,997 A * 12/1985 Takamiya et al. .......... 280/304.1
4,990,900 A * 2/1991 Kikuchi .......................... 341/20
5,648,708 A * 7/1997 Littlejohn ..................... 180/907
RE35,707 E * 12/1997 Takamiya et al. .......... 280/304.1
5,772,226 A * 6/1998 Bobichon .................. 280/250.1
5,778,996 A * 7/1998 Prior et al. ................... 180/65.1
5,945,929 A * 8/1999 Westra ............................ 341/34
6,125,957 A * 10/2000 Kauffmann .................. 180/65.1
6,154,690 A * 11/2000 Coleman ...................... 180/65.1
6,619,681 B2 * 9/2003 Gutierrez ................... 280/250.1
6,880,855 B2 * 4/2005 Chernoff et al. .............. 280/778
6,926,106 B2 * 8/2005 Richey et al. ................ 180/65.1
7,273,255 B2 * 9/2007 Nylander et al. ............. 297/338

* cited by examiner

*Primary Examiner* — Hau Phan
(74) *Attorney, Agent, or Firm* — Jackson Patent Law Office

(57) ABSTRACT

An electric wheelchair that enables users suffering from impairment of the lower extremities due to paralysis or weakness caused by aging to manage their daily lives independently for social rehabilitation by allowing them to raise and lower the seat of the wheelchair between squatting and standing positions, to support their body weight at any position by stopping the chair, and to operate the movement of the wheel chair by using their arms or elbows pressed on either the inner or outer surfaces of the armrests even if both hands are occupied or impaired.

3 Claims, 4 Drawing Sheets

ELECTRIC WHEELCHAIR

This Application is a continuation-in-part of U.S. application Ser. No. 11/515,664 of Yoshisuke Kuramoto filed Sep. 6, 2006 now abandoned for ELECTRIC WHEELCHAIR EQUIPPED WITH A RAISING/LOWERING FUNCTION, the contents of which are herein incorporated by reference. Application Ser. No. 11/515,664 claims foreign priority to Japanese Patent Application 2005-184011 filed May 30, 2005, the contents of which is hereby incorporated by reference.

BACKGROUND OF THE INVENTION

Field of the Invention

Depending on the severity of the symptoms in the legs of paralysis or weakness due to aging, patients could not manage their daily lives while receiving home care. There are times when they need to stand to prepare food, or squat to do other tasks, but these tasks are done for them. At such times if a wheelchair is available that allows patients with paralysis or weakness in the legs due to aging to freely adjust the seat to any height while supporting their body weight, they can perform the aforementioned tasks and this will make them not only more independent in managing their daily lives but also make possible social rehabilitation.

There are previous designs for a mechanism that raises and lowers a seat (Japan Pat. 2005-95491, Japan Pat. 2004-97273) and other designs that raise and lower a seat attached to an electric wheelchair (Japan Pat. 2000-42039, Japan Pat. 2001-104397) but in these designs the wheelchair user only sits as the chair is raised and lowered. In none of these designs does the chair raise the user to the standing position. Further, the raising/lowering device is below the broad surface of the seat, so the user on the seat cannot lower to a squatting position. Japan Pat. 2005-95491 describes a device that can lower to a position near the floor so the patient can mount the seat, but not so the patient can perform a task at this position.

Japan Pat. Heisei-11-137608 describes a mechanism that employs a gas spring that can raise and lower a seat between normal sitting position and the lower frame of the wheelchair, but the fulcrums of the support rods are directly below the seat so when the seat is lowered the seat support rods protrude, and when the seat is raised its height is limited to the lengths of the support rods. Further, the lock release lever of the gas spring and the link mechanism that raises the seat are arranged behind the seat, so the patient cannot reach the controls to raise and lower the seat.

These previous inventions aim mainly to reduce the work of the caregiver in the task of getting a patient into the wheelchair. The designs of the aforesaid inventions do not take into consideration the needs of the patient in managing daily activities.

Most mainstream electric wheelchairs use the joystick for the control device, but Japan Pat. 2005-87324 provides control devices on the tips of both armrests in system where the user can control the chair with the hands and fingers of both hands. However, in either case the users cannot operate such a wheelchair if their hands are holding something or occupied with some task.

BRIEF SUMMARY

Purpose

The exemplary embodiments of the invention intends to allow wheelchair users paralyzed or weakened in the lower legs due to aging to perform necessary daily tasks, greater freedom of movement, more independence in their daily lives, and to aid their social rehabilitation.

Method

The exemplary embodiments of the invention incorporates fulcrums for a wheelchair seat supported by two pairs of four support rods at separate locations, below the seat and on a frame behind the seat, and as such the mechanism increases the distance that the seat can be raised and lowered and reduces the amount of forward and backward movement as the seat is raised and lowered, and also allows the seat to recline as needed. The wheelchair seat is also designed specially in the shape of a bicycle seat with a prominent pommel at its front, so when the seat is raised and lowered the user can straddle the pommel with both legs hanging down. Pressure sensors are built into the left and right armrests that allow the wheelchair user to control the movement of the wheelchair by applying varying amounts of pressure to the inside or outside of said armrests, thus allowing the user to operate and control the chair if the hands are holding something, performing a task, or somehow impaired.

CONVENTIONS: PARTS LIST

Figure 1:
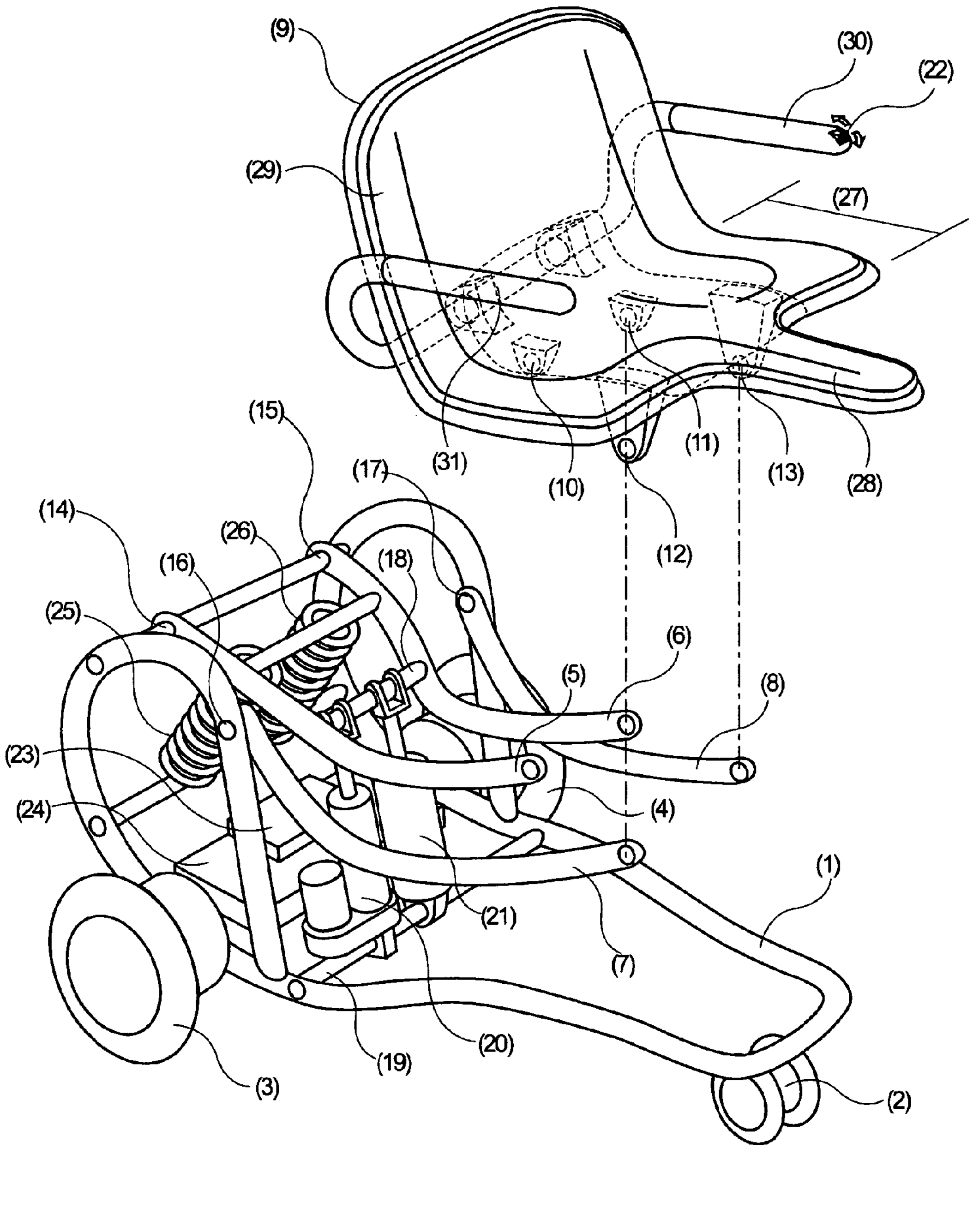
FIG. 1 is an overhead view from the front and slightly above to show the overall configuration of the wheelchair The seat is shown removed in order clarify the overall structure of the chair.

Frame
Caster
Right main wheel
Left main wheel
Support rod (rear right)
Support rod (rear left)
Support rod (front right)
Support rod (front left)
Seat
Fulcrum (rear right, below seat)
Fulcrum (rear left, below seat)
Fulcrum (front right, below seat)
Fulcrum (front left, below seat)
Fulcrum (rear right, frame)
Fulcrum (rear left, frame)
Fulcrum (front right, frame)
Fulcrum (front left, frame)
Connection pipe (rear support rod)
Connection pipe (frame bottom)
Electric actuator
Gas spring
Seat up/down switch
Control box
Battery
Coil spring (right)
Coil spring (left)
Seat rear (wide part)
Seat front (pommel)
Buffer material Armrest (left)
Armrest (right)
Hinge pin (left)
Hinge pin (right)
Forward pressure sensor (left)
Reverse pressure sensor (left)
Forward pressure sensor (right)
Reverse pressure sensor (right)
Left main-wheel drive motor
Right main-wheel drive motor

DETAILED DESCRIPTION OF EXEMPLARY EMBODIMENTS OF THE INVENTION

Problem to Be Solved

At present patients with paralysis in the lower extremities just sit in their chairs; there are no features in the designs of these chairs that allow the patient to raise or lower the chair to a standing, sitting, or squatting position to perform a task, or to hold the wheelchair in the standing position and move the chair to another location. For example, when a person unchallenged by a handicap prepares food in the kitchen, the individual stands in front of a counter and pantry to prepare the food and remove utensils and dishes from a pantry, but when a patient confined to a current wheelchair because of paralysis or weakening of the legs due to aging attempts to prepare food in the kitchen, the physically challenged cook can raise the seat of the wheelchair to reach the counter top, but the wheelchair user must remain in the sitting position (which is uncomfortable with the legs hitting the front of the counter) and then turn the chair so their legs point away from the counter. It is very difficult to perform a task with the body held in this position for a long period of time. The purpose of this exemplary embodiments of the invention is to create a wheelchair that allows a patient whose legs are paralyzed or extremely weak due to aging to remain sitting in the wheelchair but able to perform tasks from a variety of seat positions due to the wide vertical range of seat movement with little forward and reverse movement of the seat as it ascends and descends.

Further, at present wheelchairs seats that can be raised and lowered are made only for sitting, and when the seat is raised the feet ascend from the floor and as the center of gravity shifts up and this creates the serious danger of the wheelchair falling over. Further, when the seat is lowered the position of the feet are limited to the footrests with the front of both feet protruding from the footrests. The exemplary embodiments of the invention eliminates such inconveniences with a seat that is shaped to support the body of the patient with the seat in a variety of positions.

In most cases wheelchairs employ the joystick as a control device, but a joystick cannot be operated if the patients hands are occupied with some task or physically impaired. For this reason the exemplary embodiments of the invention allows the patient to operate the wheelchair even if both hands are holding something, performing a task, or physically impaired.

Means to Solve the Problem

Figure 2:
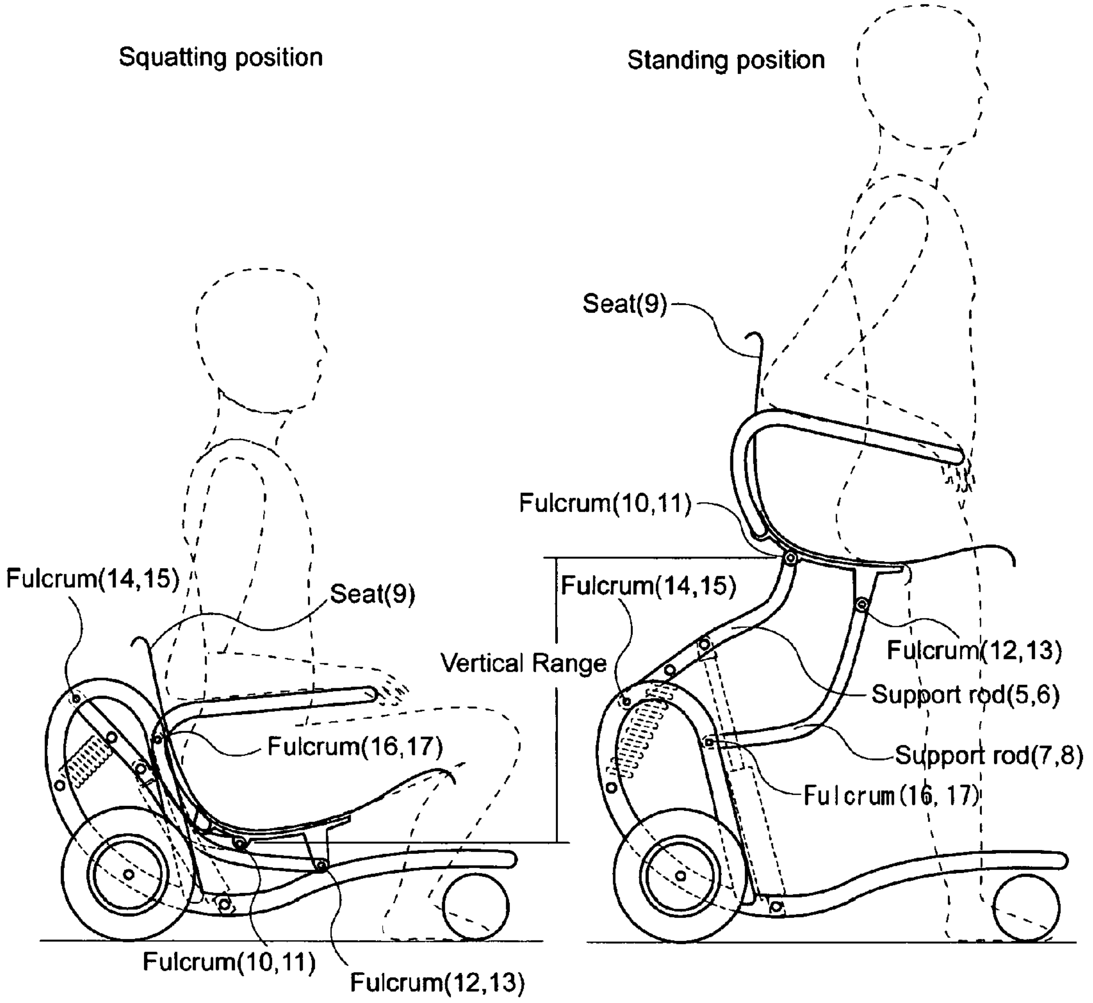
FIG. 2 shows the lowest and highest chair positions, the raising and lowering mechanism, and the position of the user's body on the wheelchair.

Two pairs of support rods (5, 6, 7, 8) of different length support the front and back of the seat at fulcrum points (10, 11 12, 13) attached to the broad bottom of the seat support the full weight of the seat at its lowest position, then the fulcrum points (14, 15, 16, 17) provided on frame (1) support the full weight of the seat when it is raised to its highest position. The support rods moves freely forward and backward at each fulcrum point. Changing the angle of the support rods at fulcrum points (14, 15, 16, 17) causes the seat to ascend and descend. Also, because the fulcrum points (14, 15, 16, 17) of the rod pairs are located at different positions the seat (9) shifts slightly forward as it ascends and shifts slightly backward as it descends. (See FIG. 2)

When the seat of a common wheelchair provided with a seat height adjustment function is raised, the patient remains sitting as the feet leave the floor and the center of gravity shifts up, making the wheelchair very unstable. This limits the range of movement of the user in operating the wheelchair and performing a task with the seat in the raised position; a sudden movement on the seat could tip the wheelchair. In order to solve these problems, when the seat is raised the patient rises to a standing position with both feet touching the floor to maintain balance, and the seat (9) is designed with a pommel (28) like a bicycle seat (the back of the seat is wide and the front narrow) so the hips and buttocks rest comfortably on the wide portion (27), thus allowing the patient to straddle the seat for a long period without discomfort. (See FIG. 1)

Figure 3:
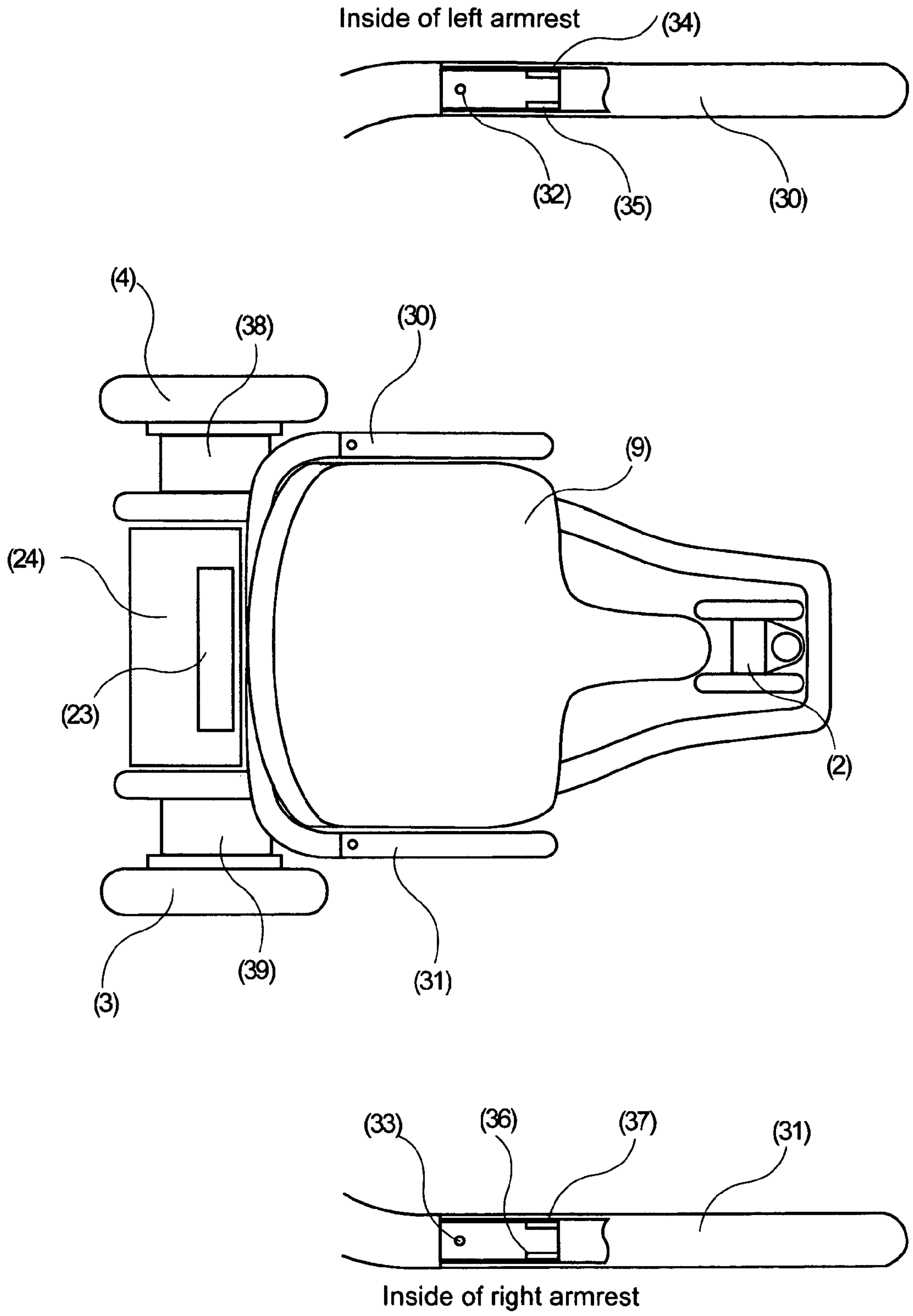
FIG. 3 shows the arrangement of the pressure sensors inside the armrests.

Four pressure sensors (34, 35, 36, 37), mounted inside the left and right armrests of the wheelchair, control the movement of the wheelchair when the patient uses the arms or elbows to press on the outer or inner surfaces of the left or right armrest. For example, pressing on the inner surface of the right armrest (31) rotates the right main wheel (3) backward and pressing on the outer surface rotates the wheel foward. Pressing on the inner surface of the left armrest (30) rotates the left main wheel (4) backward and pressing on the outer surface rotates the left wheel forward. Pressing on the inner surfaces of both the left and right armrest at the same time moves the wheelchair backward, and pressing on both the outer surfaces at the same time moves the wheelchair forward; the chair can be rotated by pressing and holding either the inner or outer surface of an armrest on only one side. The speed of rotation of the wheels can be increased or decreased by increasing or decreasing the pressure on the armrests. The movement of the wheelchair can be controlled with the selected and varied application of pressure on the pressure sensors (34, 35, 36, 37) built into the left and right armrests of the wheel chair. (See FIG. 3)

Implementation

By implementing this exemplary embodiments of the invention, a wheelchair user like one described above can raise the seat and straddle the pommel of the seat to maintain balance in a standing position while preparing food in the kitchen and facing full front to the task at hand. Also, when the user grows tired he or she can recline with the seat supporting the entire body weight. Further, the user can control the movement of the wheelchair even when the hands are occupied. The wheelchair brings amount a greater amount of free movement so wheelchair users can perform necessary daily tasks in the home at and work so they can not only manage their own lives independently but also make their occupational and social rehabilitation easier so they can contribute more to society. As the wheelchair can hold a position at any point between and squatting and standing position for a task at hand, this eliminates the problems of other wheelchairs, and work areas, sinks, furniture and other facilities do no require reforming to the needs of the wheelchair user.

Implementation: Example

As shown in FIG. 1, on this wheelchair replaceable casters (2) are attached to front part of frame (1), and the left and right main wheels (3), (4) are attached to the left and right ends. The support rods (5, 6, 7, 8) arranged front to back on frame (1) support the seat (9). The electrical actuator (20) is installed between the connection pipes (18) attached to the center of the two supports at the rear (5, 6) and the connection pipe (19)

below the frame. The signal from the seat up/down switch (22) is processed at the control box (23), and electrical current from the battery (24) is sent to the actuator (20) that raises and lowers the seat (9). To occasionally compensate for the torque of the actuator (20), the electrical actuator (20) is installed parallel to the gas spring (21). Also, when the seat is at its lowest position, in order for the electrical actuator (20) and support arms to raise the seat from this shallow angle, the system places the maximum load on the electrical actuator (20). Coil springs (25, 26) are installed as needed at the base of the rear support rods if needed to lighten a very heavy load.

The wheelchair can also provide a system with a gas spring equipped with a lock (used in place of the electric actuator) so the user can raise and lower the chair by body weight and extending the feet.

The hips and buttocks of the user rest on rear flat part of the seat (27) as the seat (9) moves from it is lowest position (squatting position) to the height of the normal sitting position (feet down at 90 degrees), then if the seat is raised still farther the weight of the user shifts forward so the user can straddle the pommel (28) of the saddle and come to a stable standing position. The differences in the lengths of the front support rods (7, 8) and rear support rods (5, 6) and the variance in the positions of the fulcrum points (14, 15, 16, 17) slant the seat (9) toward the rear when it is at a low position and slant it forward when it is at a high position, thus making for smoother movement and stability. (See FIG. 2)

The control box (23) processes the signals from the pressure sensors (34, 35, 36, 37) mounted in the left and right armrests (30. 31) of the wheelchair, and the current from the battery (2) powers the drive motors (38, 39) that drive the main wheels (3, 4). (See FIG. 3)

Pulling in the right armrest (31) bends a hinge pin (33) in to a fulcrum point and increases the pressure applied to the built-in pressure sensor (36) which causes a fluctuation in a steadily flowing electric current. This current fluctuation tells the controller to apply voltage to the drive motor (39) of the right main wheel (3) and rotates the wheel forward. Pressing out on the right armrest (31) applies pressure to the reverse pressure sensor and causes a fluctuation is a steadily flowing electric current. This current fluctuation tells the controller to apply voltage to the drive motor (39) of the right main wheel (3) and rotates the wheel in reverse.

Similarly, pulling the left armrest (30) inward rotates the main left wheel (4) forward and pushing it outward reverses the rotation of the main left wheel (4).

In short, pulling only the right armrest (31) inward rotates the wheelchair to the left and pushing it outward rotates the chair to the right. Similarly, pulling only the left armrest (30) inward rotates the wheelchair to the right and pushing it outward rotates the chair to the left. Pulling both the left and right armrests (30, 31) inward at the same time moves the wheelchair forward in a straight line and pressing both armrests outward at the same time moves the wheelchair back in a straight line.

Figure 4:
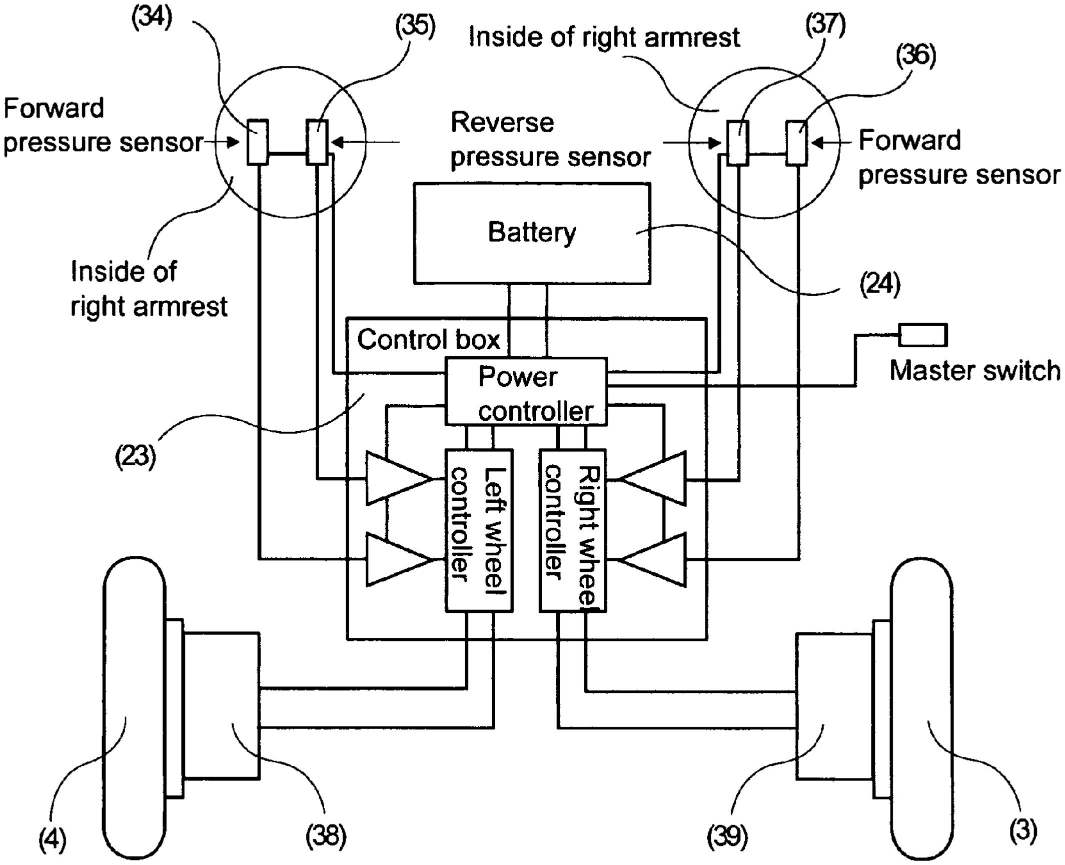
FIG. 4 is the general electrical circuit diagram.

The pressure sensors (34, 35, 36, 37) can detect the amount of pressure applied to the armrest so increasing the pressure will increase the speed of rotation of the drive motors (38, 39) and decreasing the pressure will slow down the speed of rotation of the same motors. (See FIG. 4)

In summary, each of pressure sensors (34, 35, 36, 37) generates a respective electrical signal representing a pressure value, the number of different pressure values being representable, by the electrical signal, being >2, and wherein the wheelchair generates power signals for the drive motors (38, 39), in response to the respective signals from each of the pressure sensors (34, 35, 36, 37).

As mentioned previously, building the pressure sensors (34, 35, 36, 37) into the left and right armrests (30, 31) allows the user to control the movement of the wheelchair by using the only the arms or elbows to push the armrests out or to pull them in, even while the user's hands are holding something or busy with some task.

What is claimed is:

1. A method of operating a wheelchair having a frame, a left wheel rotatably coupled to the frame; a right wheel coaxial with the left wheel, and rotatably coupled to the frame; a seat having a first side and a second side opposite the first side, a left armrest at the first side of the seat, and a right armrest at the second side of the seat, the method comprising:

pressing on an inboard surface of the right armrest at the second side of the seat, to rotate the right wheel backward;

pressing on an inboard surface of the left armrest at the first side of the seat, to rotate the left wheel backward;

pressing on an outboard surface of the right armrest opposite the inboard surface of the right armrest, to rotate the right wheel forward;

pressing on an outboard surface of the left armrest opposite the inboard surface of the left armrest, to rotate the left wheel forward;

pressing on the inboard surface of the left armrest while pressing on the inboard surface of the right armrest, to move the wheelchair in translation in a backward direction; and pressing on the outboard surface of the left armrest while pressing on the outboard surface of the right armrest, to move the wheelchair in translation in a forward direction.

2. The method of claim 1 further including increasing or decreasing wherein the speed of rotation of the wheels by increasing or decreasing the pressure on the armrests, the movement of the wheelchair thereby being controlled with the selected and varied application of pressure on the left and right armrests of the wheelchair.

3. A wheelchair comprising:

a frame;

a first wheel rotatably coupled to the frame;

a first motor that drives the first wheel;

a second wheel coaxial with the first wheel, and rotatably coupled to the frame;

a second motor that drives the second wheel;

a seat coupled to the frame, the seat having a first side and a second side opposite the first side;

a left armrest at the first side of the seat, the left armrest including a first pressure sensor configured to detect pressure on an outboard surface of the left armrest, and a second pressure sensor configured to detect pressure on an inboard surface of the left armrest, the inboard surface of the left armrest being opposite the outboard surface of the left armrest, the inboard surface of the left armrest being closer to a center of the seat than the outboard surface of the left armrest; and a right armrest at the second side of the seat, the right armrest including a third pressure sensor configured to detect pressure on an outboard surface of the right armrest, and a fourth pressure sensor configured to detect pressure on an inboard surface of the right armrest, the inboard surface of the right armrest being opposite the outboard surface of the right armrest, the inboard surface of the right armrest being closer to the center of the seat than the outboard surface of the right armrest, wherein each of the first, second, third, and fourth pressure sensors generates a respective electrical signal representing a pressure value, the number of different pressure values being representable, by the electrical signal, being >2, and wherein the wheelchair further includes a control element that generates power signals for the first motor and second motors, in response to the respective signals from each of the first, second, third, and fourth pressure sensors.

* * * * *